United States Patent
Steggles

(10) Patent No.: US 10,969,459 B2
(45) Date of Patent: Apr. 6, 2021

(54) OBJECT DETECTION

(71) Applicant: Ubisense Limited, Cambridge (GB)

(72) Inventor: Peter Joseph Steggles, Cambridge (GB)

(73) Assignee: Ubisense Limited, Cambridge (GB)

(*) Notice: Subject to any disclaimer, the term of this patent is extended or adjusted under 35 U.S.C. 154(b) by 298 days.

(21) Appl. No.: 16/098,740

(22) PCT Filed: Apr. 28, 2017

(86) PCT No.: PCT/GB2017/051210
§ 371 (c)(1),
(2) Date: Nov. 2, 2018

(87) PCT Pub. No.: WO2017/191438
PCT Pub. Date: Nov. 9, 2017

(65) Prior Publication Data
US 2019/0146055 A1 May 16, 2019

(30) Foreign Application Priority Data
May 5, 2016 (GB) ..................................... 1607899

(51) Int. Cl.
*G01S 5/02* (2010.01)
*G05B 19/418* (2006.01)
(Continued)

(52) U.S. Cl.
CPC .............. *G01S 5/0221* (2013.01); *G01S 3/14* (2013.01); *G01S 3/42* (2013.01); *G01S 5/02* (2013.01);
(Continued)

(58) Field of Classification Search
CPC ....... H04W 4/804; H04W 4/029; H04W 4/33; H04W 4/021; H04W 4/02; H04W 4/30;
(Continued)

(56) References Cited

U.S. PATENT DOCUMENTS 9,205,886 B1 * 12/2015 Hickman .............. G05D 1/0246
9,361,494 B2 * 6/2016 Swope ............... G06K 7/10128
(Continued)

FOREIGN PATENT DOCUMENTS

WO WO 2005/047930 A1 5/2005
WO WO 2008/010272 A1 1/2008

OTHER PUBLICATIONS

Jay Cadman (Ubisense): "Ubisense-Case-Studies ; 15-09-0198-00-004f-ubisense-case-studies", IEEE Draft; 15-09-0198-00-004F-Ubisense-Case-Studies, IEEE-SA Mentor, Piscataway, NJ USA, vol. 802.154f, Mar. 10, 2009 (Mar. 10, 2009), pp. 1-19, XP017667102.
(Continued)

*Primary Examiner* — Olumide Ajibade Akonai
(74) *Attorney, Agent, or Firm* — Fish & Richardson P.C.

(57) ABSTRACT

A method for detecting the presence of an object in a zone by means of a wireless detector located proximal to the zone, the wireless detector comprising an orientation sensor for sensing the spatial attitude of the detector, the method comprising: defining a solid angle relative to a first spatial reference plane, the solid angle being defined such that at least part of the zone is within that solid angle when the solid angle is projected from the location of the detector; detecting by means of the detector a wireless signal from the object, and thereby estimating the direction of the object from the detector with reference to a second spatial reference plane fixed relative to the detector; sensing by means of the orientation sensor the spatial attitude of the detector; and comparing the solid angle and the estimated direction in dependence on the sensed spatial attitude so as to determine whether the object is present in the zone.

18 Claims, 3 Drawing Sheets

(51) Int. Cl.
*G01S 3/14* (2006.01)
*G06Q 10/08* (2012.01)
*G01S 3/42* (2006.01)
*H04W 4/029* (2018.01)
*H04W 4/38* (2018.01)
*H04W 4/02* (2018.01)
*H04W 4/80* (2018.01)
*H04W 4/33* (2018.01)

(52) U.S. Cl.
CPC ....... *G05B 19/4183* (2013.01); *G06Q 10/087* (2013.01); *G05B 2219/33199* (2013.01); *H04W 4/025* (2013.01); *H04W 4/027* (2013.01); *H04W 4/029* (2018.02); *H04W 4/33* (2018.02); *H04W 4/38* (2018.02); *H04W 4/80* (2018.02); *Y02P 90/02* (2015.11)

(58) Field of Classification Search
CPC ..... H04W 4/70; H04W 64/003; H04W 84/12; H04W 4/025; H04W 4/027; H04W 4/38; H04W 64/00; H04W 40/20; H04W 4/185; H04W 12/00503; Y10S 901/46; G01C 21/206; G01S 1/02; G01S 1/7034; G01S 3/14; G01S 5/02; G01S 5/163; B60W 2556/65; G06Q 10/087; G06Q 10/063114; G06Q 10/0875; G06Q 10/047
See application file for complete search history.

(56) References Cited

U.S. PATENT DOCUMENTS

| | | | |
|---|---|---|---|
| 9,755,294 B2* | 9/2017 | Swope | H01Q 3/2605 |
| 2005/0231359 A1 | 10/2005 | Kampel et al. | |
| 2007/0236366 A1* | 10/2007 | Gur | G06K 9/00832 340/945 |
| 2009/0198371 A1 | 8/2009 | Emanuel et al. | |
| 2009/0204434 A1* | 8/2009 | Breazeale, Jr. | G06Q 30/04 705/3 |
| 2009/0212921 A1 | 8/2009 | Wild et al. | |
| 2010/0073188 A1* | 3/2010 | Mickle | G01S 5/02 340/8.1 |
| 2011/0050421 A1* | 3/2011 | Duron | G06K 7/10079 340/572.1 |
| 2013/0021174 A1* | 1/2013 | Silzer, Sr. | G05D 1/0297 340/989 |
| 2013/0324156 A1 | 12/2013 | Wallgren | |
| 2015/0097653 A1 | 4/2015 | Gibbs et al. | |
| 2015/0192656 A1 | 7/2015 | Werner et al. | |
| 2018/0144496 A1* | 5/2018 | Posner | G06T 7/73 |

OTHER PUBLICATIONS

International Search Report and Written Opinion for corresponding Appl No. PCT/GB2017/051210, dated Jul. 26, 2017, 15 pages.
UK Search Report for corresponding Appl No. GB1607899.0, dated Oct. 4, 2017, 3 pages.

* cited by examiner

OBJECT DETECTION

CROSS-REFERENCE TO RELATED APPLICATIONS

This application is a national stage of and claims priority under 35 U.S.C. § 371 to PCT Application No. PCT/GB2017/051210, filed on Apr. 28, 2017, which claims priority to British Application No. GB1607899.0, filed on May 5, 2016. The contents of both of these priority applications are hereby incorporated by reference in their entirety.

BACKGROUND

This invention relates to detecting objects in zones.

Systems are available which track the movement of objects and report the objects' positions to a central server. The server can then take a pre-programmed action in dependence on an object's location.

There are numerous ways to determine an object's location. In one approach the object is provided with a tag which determines its own location, for example by trilateration from beacons in known locations. Those beacons could be in fixed locations or could be movable, as in the case of GPS (Global Positioning System) satellites. The tag can then report its location to the central server. In another approach detector devices can receive signals from objects' tags. Each detector that receives a signal from a tag can estimate the direction and optionally the range of the tag from the detector based on the received signal. That data can then be reported to the control processor, which can estimate the location of the tag by trilateration using known locations of the detectors. The detectors can estimate the direction of the tag by means of an antenna array installed in the detectors. Other methods of location estimation, such as image recognition, avoid the use of tags.

One use for a locationing system is to track tools on a production line. In the past, power tools were normally tethered to a particular workstation by means of a power cable. Nowadays many production line tools are battery powered, and as a result they can be moved easily around the production line. One problem that arises from this is that the tools might be lost. Another problem is that the tools might have specific operational settings, such as torque limits, that are suitable for their intended workstation but unsuitable for another workstation to which they might be moved by mistake. Another problem is that it may be desired to keep an audit of the assembly operations on the production line in order to be able to prove that assembly was performed correctly. That audit can be compiled using data gathered by the power tools. It is expected that specific parts are assembled at specific workstations. If it is uncertain at which workstation the tool was being used when an operation was logged then it may be unclear which part was being worked on in that operation, and as a result the audit information may be unreliable. To address these problems a locationing system can be installed around the production line and the tools can be provided with tags. The assembly audit can be augmented with information from the locationing system about where tools were when they performed certain operations.

FIG. 1 shows a production line 1 in which workpieces 2 move along a path between successive workstations 3. Detectors 4 are used to track tags 5 which are anchored to tools 6. Typically the production line is set up on a flat factory floor, and most of the path is linear. To allow the detectors to have good reception of the tags and good angular resolution the detectors are installed in elevated positions, e.g. on poles 7, angled so as to point down at the production line. The tag directions may be reported as an azimuth and elevation relative to a reference direction of each detector, the reference direction being angled downward.

To allow the system to detect that a tool is at a specific workstation the system must be provided with information that relates the data gathered by the detectors to the boundaries of the workstations. One way to do this is for a user to specify a range of azimuth and elevation angles within which a tag can be considered to be at the workstation. However, it has been found that a system of this type can be very difficult for users to configure. The workstations are typically cuboid in shape, with vertical imaginary sides. But the angular information is typically provided as angular information relative to the detectors, which are angled downwards. For example In this system the sides of the workstations do not correspond to a readily defined range of solid angles with respect to the detectors. The three-dimensional geometry involved in the system is hard for a typical user to visualise and understand, and as a result users can find it extremely difficult to define the workstations with reference to the directional information reported by the detectors.

One solution to this is to implement a configuration procedure which involves moving a reference tag to the corners of the workstation and recording the directions from the surrounding detectors to the tag. The system can then automatically determine the ambit of the workstation. This circumvents the need for a user to define angles manually. However, this method is time-consuming, prone to error and difficult for the user to verify for audit purposes.

Similar problems arise in areas other than production technology, for example locating vehicles on roads or participants in sports events.

There is a need for an improved way of configuring a system such as the one described above.

SUMMARY OF THE INVENTION

According to a first aspect of the present invention there is provided a method for detecting the presence of an object in a zone by means of a wireless detector located proximal to the zone, the wireless detector comprising an orientation sensor for sensing the spatial attitude of the detector, the method comprising: defining a solid angle relative to a first spatial reference plane, the solid angle being defined such that at least part of the zone is within that solid angle when the solid angle is projected from the location of the detector; detecting by means of the detector a wireless signal from the object, and thereby estimating the direction of the object from the detector with reference to a second spatial reference plane fixed relative to the detector; sensing by means of the orientation sensor the spatial attitude of the detector; and comparing the solid angle and the estimated direction in dependence on the sensed spatial attitude so as to determine whether the object is present in the zone.

The step of comparing the solid angle and the estimated direction may comprise transforming the solid angle in dependence on the sensed spatial attitude so as to form a second solid angle in the same frame of reference as the direction, and comparing the second solid angle and the direction. The step of comparing the solid angle and the estimated direction may comprise transforming the direction in dependence on the sensed spatial attitude so as to form a second direction in the same frame of reference as the solid angle, and comparing the solid angle and the second direction. The step of comparing the solid angle and the estimated direction may comprise transforming the solid angle in dependence on the sensed spatial attitude so as to form a second solid angle in a third frame of reference, transforming the direction in dependence on the sensed spatial attitude so as to form a second direction in the third frame of reference, and comparing the second solid angle and the second direction.

The first spatial reference plane may be a horizontal plane. The second spatial reference plane may be non-parallel to the first spatial reference plane. The first spatial reference plane intersects the detector.

The detector may comprise a wireless receiver for receiving the signal from the object. The wireless receiver may have a region of greatest angular sensitivity. The second spatial reference plane passes through the region of greatest angular sensitivity.

The detector may be located above (i.e. at a greater height than) the zone.

The second spatial reference plane may be directed downwards from the detector towards the zone. The second spatial reference plane may be directed obliquely downwards from the detector towards the zone.

The step of defining a solid angle may be performed directly by a user. The user may directly designate the angle, for example by entering or selectin visual representations of one or more angular values that limit the solid angle.

The user may define the solid angle as an azimuth range and an elevation range which together define the extent of the solid angle.

The said spatial attitude of the detector may be an angular offset in a vertical plane between the second spatial reference plane and a predefined spatial reference plane.

The predefined spatial reference plane may be a horizontal plane.

The orientation sensor may be an accelerometer.

The orientation sensor may be a magnetic field sensor.

According to a second aspect of the invention there is provided a system for detecting the presence of an object in a zone, the apparatus comprising: a wireless detector located proximal to the zone, the wireless detector comprising an orientation sensor for sensing the spatial attitude of the detector; a user interface whereby a user can define a solid angle relative to a first spatial reference plane such that at least part of the zone is within that solid angle when the solid angle is projected from the location of the detector; and a processor; the detector being configured to detect a wireless signal from the object, and thereby estimate the direction of the object from the detector with reference to a second spatial reference plane fixed relative to the detector, and to sense by means of the orientation sensor the spatial attitude of the detector; and the processor being configured to compare the solid angle and the estimated direction in dependence on the sensed spatial attitude so as to determine whether the object is present in the zone.

The processor may be located at the detector or remote from the detector.

According to a third aspect of the invention there is provided a detector for detecting the direction of an object, the detector comprising an antenna, a receiver, an orientation sensor and a communication interface, the detector being configured to: receive a signal from the object by means of the antenna; process the received signal by means of the receiver to determine the direction of the object relative to the detector in the reference frame of the detector; process the determined direction in dependence on the orientation of the detector as sensed by the sensor to derive the direction of the object in a predetermined frame of reference independent of the orientation of the detector; and reporting the derived direction by means of the communication interface.

BRIEF DESCRIPTION OF THE FIGURES

The present invention will now be described by way of example, with reference to the accompanying drawings. In the drawings.

DETAILED DESCRIPTION

Figure 1:
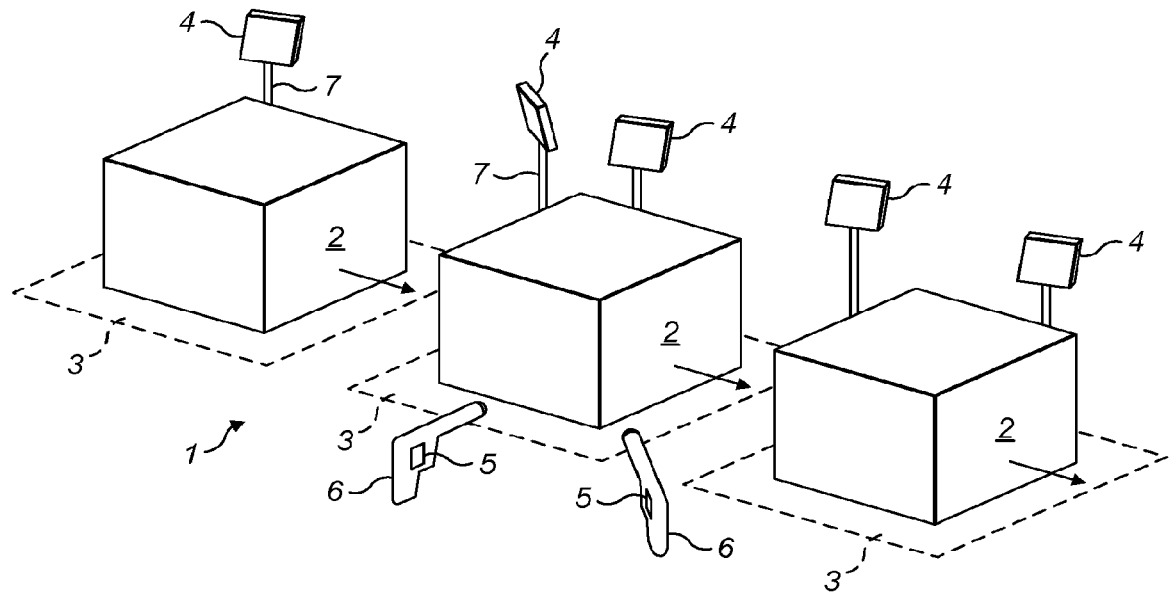
FIG. 1 shows a production line with a locationing system.
Figure 2:
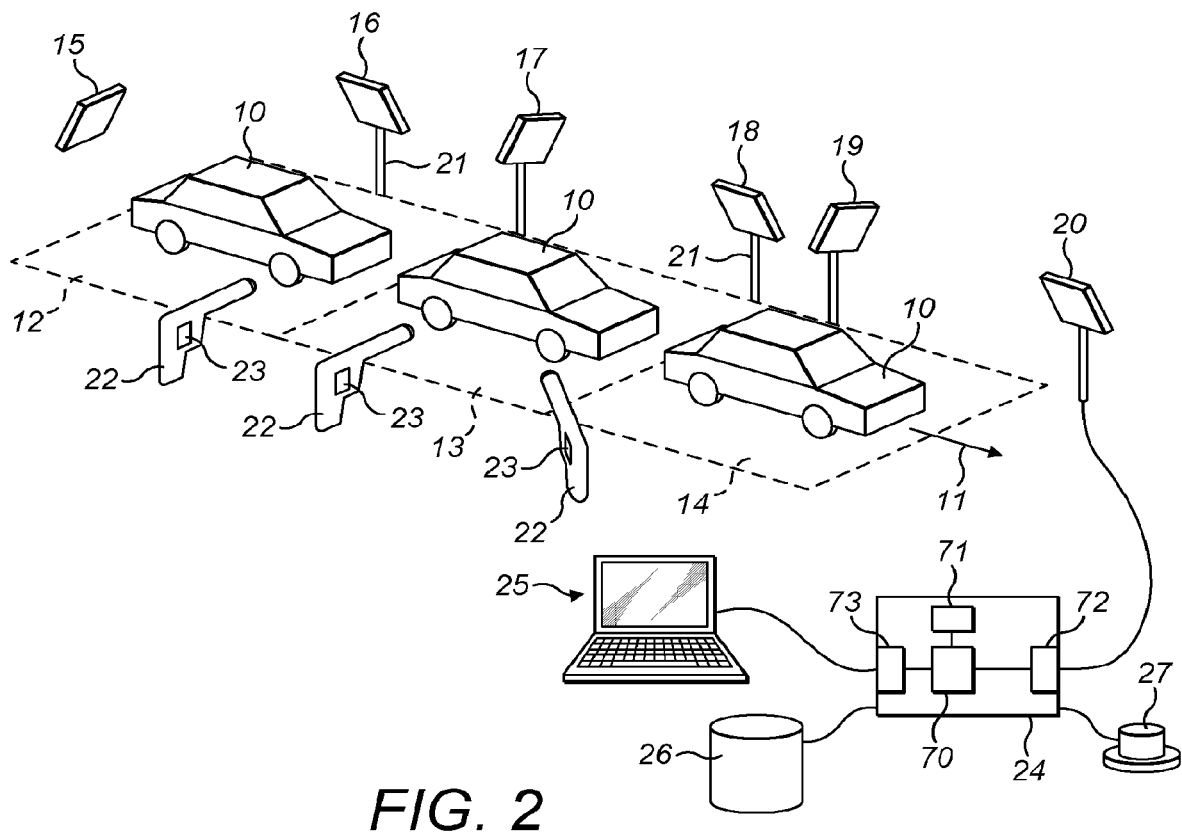
FIG. 2 shows a production line with a locationing system including a control server.

FIG. 2 shows a production line. In this example the production line is for the manufacture of vehicles but it could be for any purpose. In the production line workpieces 10 move along a path 11 between successive workstations 12, 13, 14. In a typical production line it will be expected that designated functions are performed at each workstation. Detectors 15-20 are arranged about the workstations. Each detector is elevated above the working region of the production line, for example by being installed on a pole 21 or attached to some other element of factory furniture. Elevating the detectors increases the volume of the production line to which they have a relatively unobstructed reception path. Tools 22 are used in the production line. The tools could be powered or manual tools. They could, for example, be wrenches, screwdrivers, clip dispensers, adhesive guns or any other relevant type of tool. The tools could be capable of transmitting data to a production audit system 26. A locating tag 23 is affixed to each tool.

The detectors are communicatively coupled to a central server 24, which is in turn coupled to a configuration terminal 25. The central server can also communicate with an audit store 26 to store production audit data and with an alerting device 27 such as a siren or lamp to provide alerts to staff on the production line. The function of the server could be implemented in a stand-alone device, as indicated in FIG. 2, or could be integrated into one or more of the detectors.

The locating tags and the detector can communicate to permit each detector to estimate the direction to each tag that is in range of it. One way in which this may be done is for the tags to periodically transmit a radio pulse, and for those pulses to be received by an antenna array at the detector. By comparing the times of arrival, time-differences of arrival or phases of a pulse as received by each member of the antenna array, or by using a combination of those metrics, the direction of the tag relative to the detector can be estimated. One example of a system that operates in this way is the Dimension4 detector and tag system available from the applicant.

Figure 3:
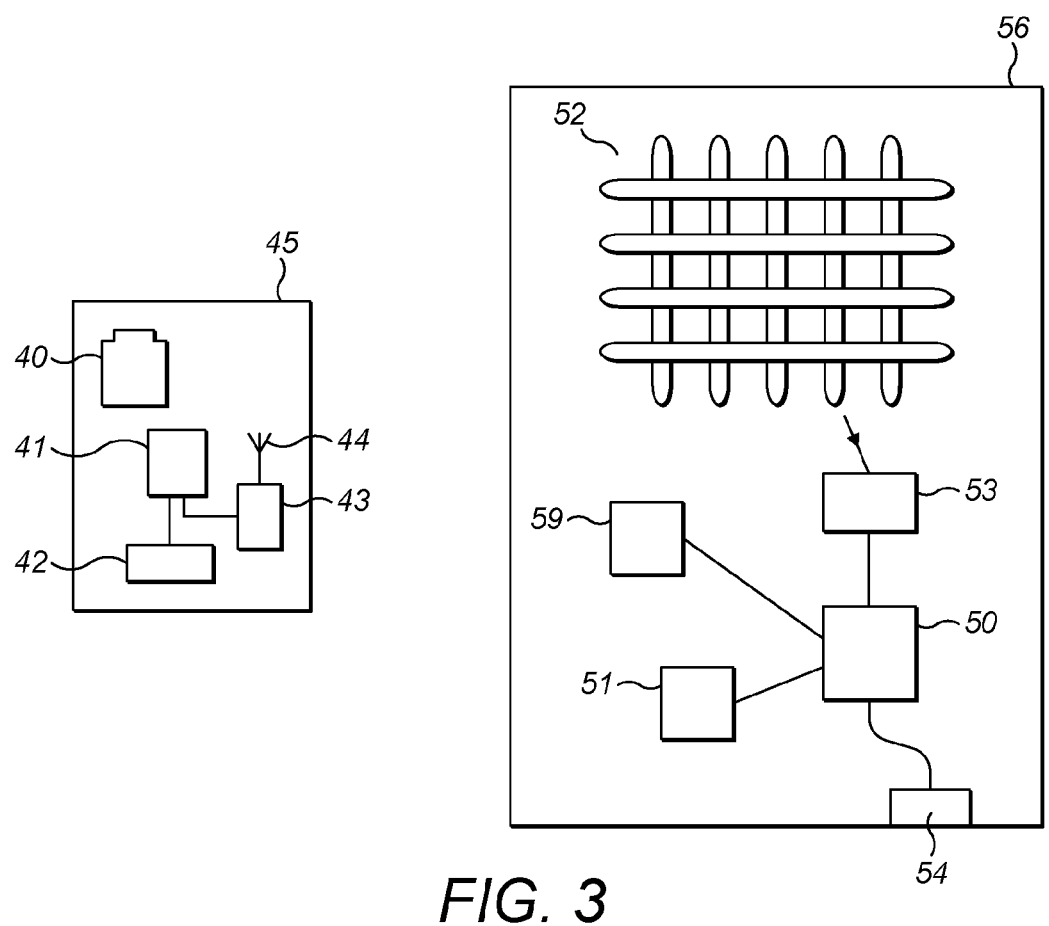
FIG. 3 is a schematic drawing of a tag and a detector.

FIG. 3 shows an example of a cooperating pair of tag and detector.

The tag comprises a battery 40, a control processor 41, a memory 42, a radio transmitter 43 and an antenna 44. The battery powers the device. The memory stores a unique identifier for the tag. The control processor 41 operates to, from time to time, cause the radio transmitter 43 to transmit by means of the antenna 44 a radio signal that identifies the tag. The tag is encased with a housing 45.

Figure 4:
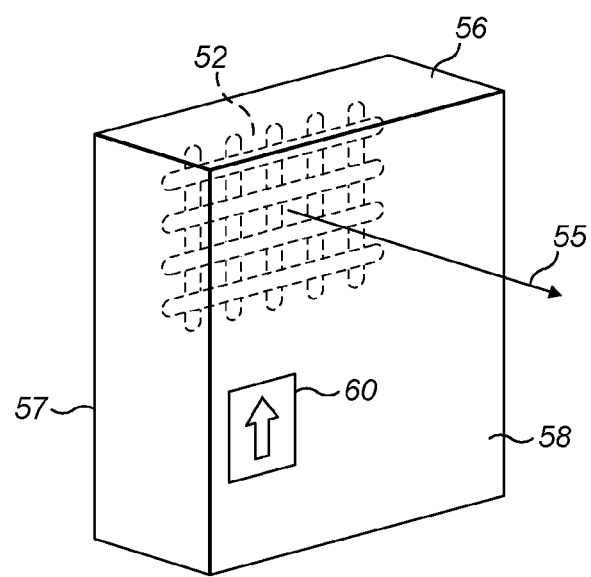
FIG. 4 is an oblique view of the detector of FIG. 4, illustrating a reference direction.

The detector comprises a control processor 50, a memory 51, an antenna array 52, an RF (radio frequency) receiver circuit 53 and a communications interface 54. The memory 51 stores, in a non-transient way, program code for execution by the processor 50 to cause it to perform the functions described below. The antenna array is configured to receive signals transmitted by the tag and to permit the receiver circuit 53 to discriminate between received signals so as to identify their direction with reference to a reference direction. The reference direction is indicated at 55 in FIG. 4. This may be done based on time of arrival, time-difference of arrival, phase or another method. When a signal is received the receiver circuit estimates its direction, extracts the transmitted tag identifier from the signal and reports the direction and tag identifier to the control processor 50. The control processor then transmits the tag identifier and the direction to the central server 24 via communications interface 54. Interface 54 could, for example, use one of the Ethernet, USB, WiFi, Bluetooth protocols, or another protocol. The detector is encased with a housing 56. The housing could be of any suitable shape, but it is convenient for it to have major faces at its rear and/or front which are substantially flat. A flat rear face permits the detector to be readily mounted on a flat surface. The reference direction 55 can conveniently be perpendicular to the rear face 57 or the front face 58 of the housing (see FIG. 4). That helps an installer to see easily where the reference direction will be. It is convenient for the housing to have indicia 60 on its exterior indicating the rotational sense about the reference direction with respect to which the direction of a tag will be measured. The indicia could be lines printed or embossed on the surface of the housing, or they could be defined by the sides and/or ends of the housing itself. The detector further has an orientation sensor 59. The orientation sensor is capable of sensing the orientation of the detector relative to vertical. The orientation sensor could, for example, be an accelerometer sensitive to gravity. The orientation sensed by the accelerometer is passed to the control processor 50, which can report it to the central server. The orientation can be used for a range of functions, for example to permit the central server to detect when the detector has been nudged out of position. The tag and the detector may both have radio transceivers. In that way the detector can attempt to locate a tag on demand by transmitting a signal addressed to that tag which instructs the tag to transmit a locationing signal back to the detector.

When the detector receives a pulse from a tag, processing circuitry in the detector processes the received signals and estimates the direction of the tag relative to a reference direction. The detector will typically have a certain frustum over which it is able to receive the tag with a reasonable degree of sensitivity, and typically the detector's resolution of the tag's direction will be most sensitive at the centre of that frustum. It is convenient to make that direction orthogonal to the major faces of the detector's casing, although it need not be. Conveniently the reference direction 55 is at or close to the direction where the tag has greatest angular accuracy, for example within 5° of that direction. Conveniently the reference direction is orthogonal to the major face(s) of the detector's casing, or within 5° of such a direction.

The detector can report the direction of a tag using any suitable form of spherical coordinates. One convenient format is as a pair of angles representing an azimuth and an elevation. The azimuth can be taken in a reference plane containing the reference direction. Conveniently that reference plane is horizontal for a standard installation of the detector. The standard installation may be when the back surface 57 of the detector's casing is vertical (so the detector has no tilt) and the indicia 60, or the sides of the detector's casing, are also vertical (so the detector has no roll). The elevation can then be taken in a plane perpendicular to the reference plane.

Referring again to FIG. 2, the central server comprises a processor 70, a memory 71 and communication interfaces 72 and 73. The memory stores in a non-transient way program code for execution by the processor to permit it to perform its functions and also stores in a non-transient way configuration information defining the configuration of the system. The configuration information might include a list of the identities of the tags that are associated with specific objects, and data defining the locations of the detectors. The configuration data can also include rules defining conditions relating to the locations of tags and corresponding actions to be taken when the conditions are met. These rules will be discussed in more detail below. The detectors communicate with the server via interface 72. Interface 73 is coupled to a configuration terminal 25. The configuration terminal is a standard computer terminal having a display and an input mechanism such as a keyboard and/or a mouse. The configuration terminal is set up to permit a user to interact with the server to define at least some of the server's configuration data, including the rules.

Each rule comprises the following information:
- For each of one or more detectors a defined solid angle. As will be discussed in more detail below, that may be a solid angle defined with respect to the detector's reference direction or in another way.
- If solid angles are defined for more than one detector, logic for combining the outputs of those detectors.
- An action to be taken when the rule is satisfied.
- Optionally a definition of the identity of one or more tags to which the rule applies.
- Optionally other conditional information such as times when the rule is active.
- Optionally a reference for the rule which indicates what space it relates to, for example a specific workstation.

The server is configured to, from time to time, compare the data it has received from the detectors with one or more of the rules. The server is configured to, if a rule is successful (i.e. if all the criteria of the rule are satisfied), automatically take the action defined in that rule. The server may perform these comparisons periodically or when triggered by an external device. For example the server may perform the comparison when triggered by the audit store 26 so as to determine whether a specific tool that is to be audited is in a specific workstation.

The way in which a solid angle for a detector can be defined in a rule will now be described. A user interface for the configuration terminal 25 can show a first zone where a range of elevation angles can be defined and a second zone where a range of azimuth angles can be defined. The mechanism for defining the angles may be by a user dragging icons representing upper and lower angle limits using a mouse or touch screen, or by adjusting the position of the angles using a keyboard, or by entering the angles numerically. Thus the user enters the angles directly as opposed, for example, to them being computed by the system based on the user entering the coordinates of the workstation. Once the range of azimuth angles and the range of elevation angles are defined the user can cause them to be stored to the relevant rule. The user can also enter any other information relevant to the rule by means of the terminal, for example the base station to which the angles apply and the tag identity to which the rules apply.

In one approach, the rules are defined with reference to ranges of azimuth and elevation angles which are defined with respect to the reference direction and plane of the detector. In this approach the angles as defined in the user interface correspond directly to the coordinate system in which angles are reported by the detectors. A problem with this approach is it is extremely difficult for most users to operate successfully. The part of each detector's frustum that provides the best angular resolution is typically in the centre of the detector's frustum; and conveniently the reference direction is also in the centre of the detector's frustum. For best angular resolution in a workstation when the detector is positioned above the workstation the detector should be pointed down at the workstation. This results in a complex relationship between the azimuth and elevation as reported by the detector, and the boundaries of the workstation, which are typically linear. It has been found that users find it very difficult to visualise the boundaries of a workstation as defined in this coordinate space.

In a second approach, the rules are defined with reference to ranges of azimuth and elevation angles which are defined with respect to a reference plane that can be offset from the reference plane of the detector. Conveniently the offset elevation angles are defined with respect to a plane that is horizontal, or at another predetermined spatial attitude. For example, the plane may be co-planar with the working zone of the production line or other region where positions are to be measured. Conveniently the plane passes through the detector. Conveniently the azimuth is defined in that plane and with respect to the projection into that plane of the reference direction of the detector and/or of a line extending directly out of the centre of the detector. In this approach, the user operates the same user interface, as shown in FIG. 5, but the angle ranges defined by the user interfaces are considered to be in the transformed coordinate space, as described above. Because the transformed coordinate space is based on a horizontal reference plane (or one that is otherwise related to the plane in which the activity to be measured takes place) it is cognitively much easier for a user to define and validate angles in the transformed coordinate space.

Figure 5A:
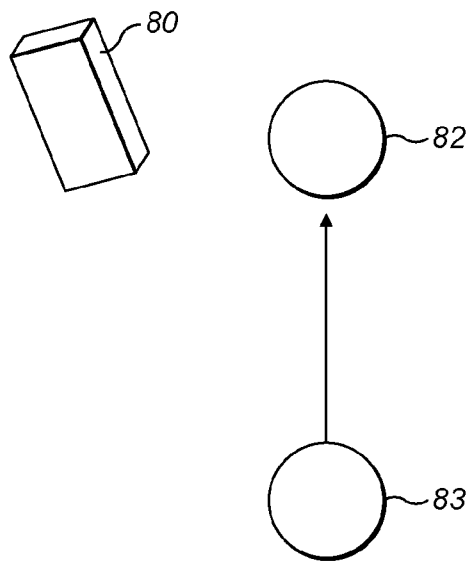
FIG. 5 illustrates the results of moving an object vertically in the frame of reference of a detector and in a transformed frame of reference.
Figure 5B:
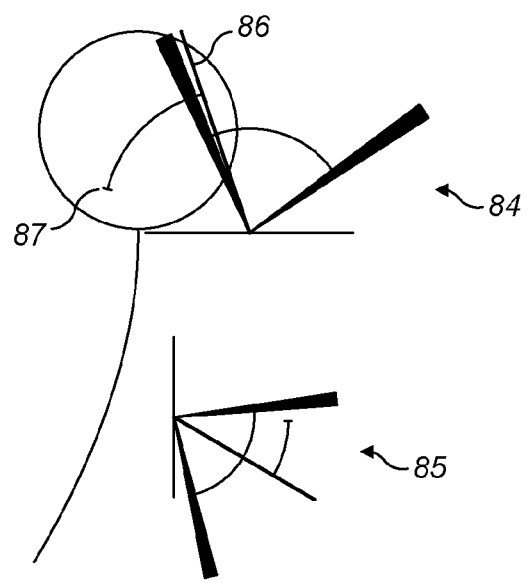
Figure 5C:
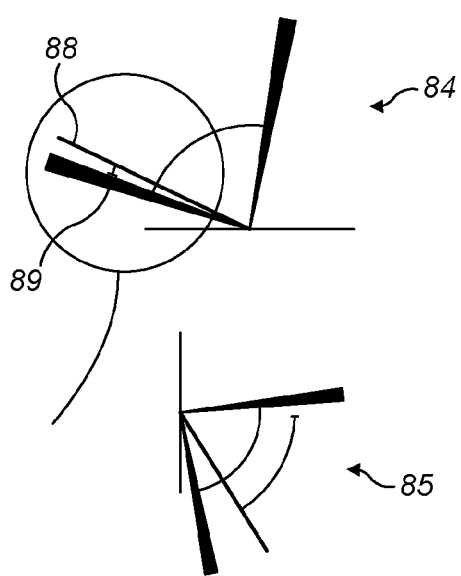

This is illustrated in FIGS. 5*a*, 5*b* and 5*c*. FIG. 5*a* shows a set-up in which a detector 80 is pointed downwards and is tracking the vertical movement of a tool from a position at 82 to a position at 83. FIG. 5*b* shows the motion of the tool as azimuth (at 84) and elevation (at 85) with respect to the reference direction/plane of the detector as the tool is moved. Although the tool is moved vertically there is a substantial change in azimuth as indicated from 86 to 87 as the tool is moved. FIG. 5*c* shows the motion of the tool as azimuth (at 84) and elevation (at 85) with respect to the transformed horizontal reference plane as the tool is moved. There is negligible change in azimuth as indicated from 88 to 89 as the tool is moved. This corresponds conceptually to a typical user's expectation of an output indicating vertical motion.

In the transformed coordinate space a single solid angle, defined by a pair of azimuth and elevation angle ranges, corresponds to a frustum of a rectangular based pyramid where the limit of the frustum is orthogonal to the reference plane of the transformed coordinate space. If the reference plane is horizontal then the limit of the frustum is vertical. This makes it easy for a user to visualise, and it conveniently defines the limits of a typical workstation.

When the angles in the rules are defined with respect to the transformed coordinate space the server converts between the transformed coordinate space and the detector coordinate space in order to apply the rules. This may be done directly or via an intermediate solid angle representation that is suited to angle combination, such as quaternions. A q function can be defined which will transform a triple of Euler angles (in the standard yaw, pitch roll order) into a quaternion. Given some tag direction reported as azimuth A and elevation E defined in a detector coordinate space whose reference plane/direction is at a pitch P and roll R relative to horizontal, the transformed angles can be calculated by calculating the quaternion $T=q(0,P,R)\times q(A,E,0)$, using the inverse of q to find the triple of Euler angles corresponding to T, and selecting the yaw and pitch from this triple. If it is desired to transform only for detector pitch, regarding roll as negligible, then 0 can be substituted for R in the above calculation. The transformed angles can then be compared with the solid angles defined in the relevant rule. Alternatively, the comparison may be performed in the detector coordinate space, by converting the solid angles to detector space, or in an intermediate space, by converting both the solid angles and the reported tag directions to the intermediate space. In order to transform from the coordinate space of a detector to the transformed coordinate space it is necessary to have an estimate of the pitch of the detector's reference direction 55 relative to the reference plane in the transformed coordinate space (typically, horizontal). One way to obtain this information is for the person who installs the detector to measure its pitch and provide that information to the server 24.

Another approach is for the detector's pitch to be determined automatically from the accelerometer 59 in the detector itself. The processor 50 of the detector could receive the pitch from the accelerometer and report that to the server. This could be done automatically at power-up and/or from time to time during use. Measuring the pitch during use allows any tilting of the detector after installation to be automatically taken into account in the coordinate transformations. The reported pitch can then be used as P in the method described above, or in another method to achieve the same result.

It is preferred that the detector is installed so that there is negligible roll of the centreline of the detector about the reference direction. However, if the detector has been installed with some roll, or if it is nudged during use, that roll can be compensated for using an analogous technique to the one described above. That is, the roll can be measured by means of the accelerometer, reported to the server and the server can apply an angle transformation to convert the azimuth and elevation as reported by the detector to ones that are as if the detector had zero roll.

A simple rule may relate to the presence or non-detection of a tag within a solid angle defined at a single detector. For example, tool 22 may be deemed to be present at workstation 12 if its tag 23 is detected within a solid angle defined at detector 16. More complex rules may relate to the presence or non-detection of a tag within solid angles defined at multiple detectors. These states may be combined using logic defined in the rule. The logic may comprise definitions using logical operators such as AND, OR, and NOT which link the multiple solid angle definitions. For example, a tool 22 may be deemed to be present at workstation 13 if its tag 23 is detected within a first solid angle defined at detector 17 or within a second solid angle defined at detector 18. This allows for more comprehensive coverage of a workstation. In another example, a tool 22 may be deemed to be on the left-hand side of workstation 13 if (i) its tag 23 is detected within a first solid angle defined at detector 17 or within a second solid angle defined at detector 18 and (ii) its tag 23 is detected within a third solid angle defined at detector 15, which is directed along the production line. By joining angle definitions in this way it is possible to develop more comprehensive and precise definitions of the workstations.

In this way it is possible to mark out regions of space, such that a tag will trigger a defined action if it is detected in or not in a region.

In the system described above, the detectors report angles with reference to their local coordinate space, and those angles are transformed at the server. The location where the transformation takes place is not significant. For example, the transformation could take place at the detector. The detector has access to pitch and optionally roll information from its accelerometer. It could use that to convert measured angles into a different coordinate space, for example one with a horizontal reference plane and a reference direction that is the projection of its own reference direction into that plane. Then it could report those converted angles to the server. In another alternative, the detectors could report raw RF measurement information to the server, and the server rather than the detectors could determine measured angles using that data.

It is preferred that a user can choose whether a particular detector's data should be pitch corrected. Not pitch correcting a detector's data is useful if, for example, the detector is to be installed facing down on a workstation.

In the examples given above the locationing system is used for tracking tools on a production line. The system could be used for any suitable purpose, for example tracking garments in a zones of a shop, tracking participants in a sporting event in multiple zones where the event takes place or tracking vehicles in various regions along a road.

The device for sensing the attitude of the detector could, for example, be a magnetic sensor, e.g. a magnetic gradiometer, a gyroscope-based accelerometer or a mechanical sensor.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of detecting the presence of an object in a zone by a wireless detector located proximal to the zone, the wireless detector comprising an orientation sensor configured to sense the spatial attitude of the detector, the method comprising:
defining a solid angle relative to a first spatial reference plane, the solid angle being defined such that at least part of the zone is within that solid angle when the solid angle is projected from the location of the detector;
detecting at the detector a wireless signal from the object, and thereby estimating the direction of the object from the detector with reference to a second spatial reference plane fixed relative to the detector;
sensing at the orientation sensor the spatial attitude of the detector; and comparing the solid angle and the estimated direction in dependence on the sensed spatial attitude so as to determine whether the object is present in the zone.

2. A method as claimed in claim 1, wherein the step of comparing the solid angle and the estimated direction comprises transforming the solid angle in dependence on the sensed spatial attitude so as to form a second solid angle in the same frame of reference as the direction, and comparing the second solid angle and the direction.

3. A method as claimed in claim 1, wherein the step of comparing the solid angle and the estimated direction comprises transforming the direction in dependence on the sensed spatial attitude so as to form a second direction in the same frame of reference as the solid angle, and comparing the solid angle and the second direction.

4. A method as claimed in claim 1, wherein the step of comparing the solid angle and the estimated direction comprises transforming the solid angle in dependence on the sensed spatial attitude so as to form a second solid angle in a third frame of reference, transforming the direction in dependence on the sensed spatial attitude so as to form a second direction in the third frame of reference, and comparing the second solid angle and the second direction.

5. A method as claimed in claim 1, wherein the first spatial reference plane is a horizontal plane.

6. A method as claimed in claim 1, wherein the second spatial reference plane is non-parallel to the first spatial reference plane.

7. A method as claimed in claim 1, wherein the first spatial reference plane intersects the detector.

8. A method as claimed in claim 1, wherein the detector comprises a wireless receiver configured to receive the signal from the object, the wireless receiver having a region of greatest angular sensitivity, and the second spatial reference plane passing through the region of greatest angular sensitivity.

9. A method as claimed in claim 1, wherein the detector is located above the zone.

10. A method as claimed in claim 1, wherein the second spatial reference plane is directed downwards from the detector towards the zone.

11. A method as claimed in claim 1, wherein the step of defining a solid angle is performed directly by a user.

12. A method as claimed in claim 11, wherein the user defines the solid angle as an azimuth range and an elevation range which together define the extent of the solid angle.

13. A method as claimed in claim 1, wherein the said spatial attitude of the detector is an angular offset in a vertical plane between the second spatial reference plane and a predefined spatial reference plane.

14. A method as claimed in claim 13, wherein the predefined spatial reference plane is a horizontal plane.

15. A method as claimed in claim 1, wherein the orientation sensor is an accelerometer.

16. A method as claimed in claim 1, wherein the orientation sensor is a magnetic field sensor.

17. A system configured to detect the presence of an object in a zone, the apparatus comprising:
a wireless detector located proximal to the zone, the wireless detector comprising an orientation sensor configured to sense the spatial attitude of the detector;
a user interface whereby a user can define a solid angle relative to a first spatial reference plane such that at least part of the zone is within that solid angle when the solid angle is projected from the location of the detector; and a processor;

the detector being configured to detect a wireless signal from the object, and thereby estimate the direction of the object from the detector with reference to a second spatial reference plane fixed relative to the detector, and to sense at the orientation sensor the spatial attitude of the detector; and the processor being configured to compare the solid angle and the estimated direction in dependence on the sensed spatial attitude so as to determine whether the object is present in the zone.

18. A server configured to detect the presence of an object in a zone, the server comprising:
- a first communication interface configured to receive, from a wireless detector located proximal to the zone, an estimated direction of the object with reference to a second spatial reference plane fixed relative to the detector, and a spatial attitude of the detector;
- a second communication interface configured to receive, from a user interface, a solid angle defined relative to a first spatial reference plane such that at least part of the zone is within that solid angle when the solid angle is projected from the location of the detector; and
- a processor configured to compare the solid angle and the estimated direction in dependence on the sensed spatial attitude so as to determine whether the object is present in the zone.

\* \* \* \* \*